United States Patent
Lim et al.

(10) Patent No.: US 8,478,517 B2
(45) Date of Patent: Jul. 2, 2013

(54) METHOD AND APPARATUS TO PROVIDE LOCATION INFORMATION

(75) Inventors: Myoung-Kyun Lim, Seoul (KR); Hyo-sun Shim, Seongnam-si (KR); Jin-hyeon Choi, Seoul (KR); Min-chul Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1074 days.

(21) Appl. No.: 12/417,073

(22) Filed: Apr. 2, 2009

(65) Prior Publication Data

US 2009/0319167 A1     Dec. 24, 2009

(30) Foreign Application Priority Data

Jun. 19, 2008   (KR) .................. 10-2008-0058046

(51) Int. Cl.
*G01C 21/00*   (2006.01)

(52) U.S. Cl.
USPC ........... 701/410; 701/420; 701/451; 701/453; 701/461

(58) Field of Classification Search
USPC ................. 701/450, 451, 453, 410, 420, 430, 701/461, 468
See application file for complete search history.

(56) References Cited

U.S. PATENT DOCUMENTS

| 3,951,264 A | * | 4/1976 | Heidecker et al. | 206/308.3 |
| 2006/0235606 A1 | * | 10/2006 | Finn et al. | 701/200 |
| 2009/0112452 A1 | * | 4/2009 | Buck et al. | 701/117 |

* cited by examiner

*Primary Examiner* — David H Bollinger
(74) *Attorney, Agent, or Firm* — Staas & Halsey LLP

(57) ABSTRACT

A method of providing location information through a navigation device, the method including: obtaining location information from the Internet; and converting the obtained location information into data that can be used in the navigation device.

23 Claims, 5 Drawing Sheets

FIG. 4A www.naver.com/ 1143.

Re : GANGNAM GOOD FOOD RESTAURANT RECOMMENDATION

RESTAURANT LOCATED IN YANGJAE-DONG, SEOCHO-GU, SEOUL IS SHOWN
THE RESTAURANT IS LOCATED AT THE POI CROSSROADS IN YANGJAE-DONG AND IS NAMED SAEMAEUL RESTAURANT
: : :
WELL KNOWN FOR 'STEAMED KIMCHI' AND 'GRILLED PORK' AT A COST OF 7,000 WON PER PERSON.

FIG. 4B www.naver.com/ 1143.

Re : GANGNAM GOOD FOOD RESTAURANT RECOMMENDATION

RESTAURANT LOCATED IN YANGJAE-DONG, SEOCHO-GU, SEOUL IS SHOWN
THE RESTAURANT IS LOCATED AT THE POI CROSSROADS IN YANGJAE-DONG AND IS NAMED SAEMAEUL RESTAURANT

KEY WORD SEARCH

: : :
WELL KNOWN FOR 'STEAMED KIMCHI' AND 'GRILLED PORK' AT A COST OF 7,000 WON PER PERS

FIG. 4C www.naver.com/ 1143.

Re : GANGNAM GOOD FOOD RESTAURANT RECOMMENDATION

RESTAUR  SEARCH RESULT
       NAME            ADRESS   PHONE NUMBER
SEOUL  SAEMAEUL RESTAURANT  SEOUL    02-652-5258   IN
THE RES  SAEMAEUL CO.         BUSAN    051-433-1571  NT
YANGJA     …
       SAEMAEUL RESTAURANT  SEOUL    02-832-7854
: : :
WELL KNOWN FOR 'STEAMED KIMCHI' AND 'GRILLED PORK' AT A COST OF 7,000 WON PER PERSON.

FIG. 4D www.naver.com/ 1143.

Re : GANGNAM GOOD FOOD RESTAURANT RECOMMENDATION

RESTAUR  SEARCH RESULT
       NAME            ADRESS   PHONE NUMBER
SEOUL  SAEMAEUL RESTAURANT  SEOUL    02-652-5258   IN
THE RES  SAEMAEUL CO.         BUSAN    051-433-1571  NT
YANGJA     …
       SAEMAEUL RESTAURANT  SEOUL    02-832-7854
: : :
WELL KNOWN FOR 'STEAMED KIMCHI' AND 'GRILLED PORK' AT A COST OF 7,000 WON PER PERSON.

METHOD AND APPARATUS TO PROVIDE LOCATION INFORMATION

CROSS-REFERENCE TO RELATED APPLICATIONS

This application claims the benefit of Korean Patent Application No. 2008-58046, filed on Jun. 19, 2008, in the Korean Intellectual Property Office, the disclosure of which is incorporated herein, by reference.

BACKGROUND OF THE INVENTION

1. Field of the Invention

Aspects of the present invention relate to a method and apparatus to provide location information.

2. Description of the Related Art

As traffic congestion has increased, so has the popularity of navigation devices. In particular, navigation devices that rapidly and accurately output information about a desired target location have become especially popular. However, in order to search for a route to a desired target location with such a navigation device, the name or address of the desired target location has to be known in advance.

Due to the development of the IT industry, communication infrastructure networks have proliferated, which enable a user to rapidly obtain desired information through the Internet. Accordingly, information, such as recommended tourist spots and restaurants, can be easily obtained through search engines or personal blogs. When a user has not decided on a desired target location, or has no information about the desired target location, such location information can be obtained from web pages, in order to then set the desired target location on the navigation device.

However, many web pages do not include detailed location information and may only include phone numbers of the desired target location. In this case, a user is inconvenienced since the user has to continue to search for location information, or has to call a phone number to determine the name or address of the desired target location. In addition, even if web pages include detailed location information, such information may not be registered to a database of the navigation device. In this case, the user has to manually input the address of the desired target location into the navigation device.

SUMMARY OF THE INVENTION

Aspects of the present invention provide a method and apparatus to provide location information.

According to aspects of the present invention, there is provided a method of proving location information through a navigation device, the method including: obtaining location information from the Internet; and converting the obtained location information into a format that can be used by the navigation device.

According to aspects of the present invention, the obtaining of the location information may include: extracting a key word that is to be used in requesting the location information, from text data provided from a web page; sending a request to an external server for location information related to the key word; and in response to the request, receiving the location information from the external server.

According to aspects of the present invention, the obtaining of the location information may include: a user selecting a key word that is used to request the location information, from text data provided from a web page; sending a request to an external server for location information that is related to the key word; and in response to the request, receiving the location information from the external server.

According to aspects of the present invention, the method may further include: ranking the received location information, according to a predetermined standard; outputting the received location information, based on the ranking; and selecting a certain portion of the output location information. The converting of the obtained location information may include converting the selected location information into a format that can be used by the navigation device.

According to aspects of the present invention, the method may further include setting a target location on the navigation device, using the converted location information.

According to aspects of the present invention, the ranking may be determined according to the correspondence between the received location information and data provided from a web page.

According to aspects of the present invention, the location information may be point of interesting (POI) data.

According to another aspect of the present invention, there is provided a method of providing location information through a navigation device, the method including: searching for stored location information that relates to an input key word; when the location information is not stored, sending a request to an external server for location information that is related to the key word; receiving the location information from the external server; and converting the received location information into a format that can be used by the navigation device.

According to aspects of the present invention, the method may further include ranking the converted location information, according to a predetermined standard; and outputting the converted location information, based on the ranking.

According to aspects of the present invention, the method may further include: selecting some of the output location information; and setting a target location on a navigation device, using the selected location information.

According to another aspect of the present invention, there is provided an apparatus to providing location information through a navigation device, the apparatus including: a location information obtaining unit to obtain location information from the Internet; and a converter to convert the obtained location information into data that can be used in the navigation device.

According to another aspect of the present invention, there is provided an apparatus to provide location information through a navigation device, the apparatus including: a determining unit to search for stored location information related to an input key word; a request unit to send a request to an external server for location information related the key word, if the location information is not found by the search; a receiver to receive the location information from the external server, in response to the request; and a converter to convert the received location information into a format that can be used in the navigation device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which:

FIGS. 4A-4D illustrate screen shots related to obtaining location information, using an apparatus to provide location information, according to an exemplary embodiment of the present invention;

DETAILED DESCRIPTION OF THE EXEMPLARY EMBODIMENTS

Figure 1:
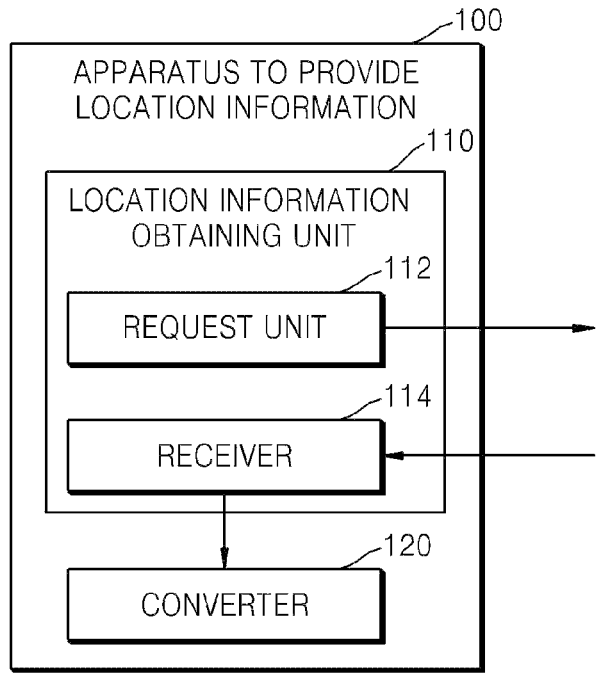
FIG. 1 is a block diagram of an apparatus to provide location information, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a block diagram of an apparatus 100 to provide location information, according to an exemplary embodiment of the present invention. The apparatus 100 includes a location information obtaining unit 110 and a converter 120.

The location information obtaining unit 110 obtains desired location information from a web page. Hereinafter, a first case where detailed location information is provided by a web page, and a second case where only schematic location information is provided by a web page, are separately described. The detailed location information includes information sufficient to set a location that can be used in a navigation device.

As an example of the first case, where detailed location information is provided from a web page, a user directly inputs a location name into a search engine, which provides a web page with detailed location information. The location information obtaining unit 110 may directly obtain the detailed location information from the web page. In this case, the converter 120, as will be described later, converts the obtained detailed location information into a format and/or data that can be used in the navigation device, thereby expanding the navigation data.

As an example of the second case, where only schematic location information is provided from the web page, the user may access web pages related to a location, such as blogs related to 'famous restaurants' or 'famous tourist spots', or personal homepages/blogs. In this case, geographical information about the location may not be included in the web pages. Instead, simple information, such as the name and the phone number of a restaurant, may be included. The user can then search for the detailed location information, using the simple information provided by the web pages.

Hereinafter, a process of obtaining location information using the location information obtaining unit 110 is described, based the second case. The location information obtaining unit 110 may include a request unit 112 and a receiver 114.

The request unit 112 obtains a key word from a web page and sends a request to an external server (not shown) for location information relating to the key word. The external server can access a database including the location information. Herein, a key word refers to single key words and/or key word phrases. The user may directly select a key word from the information provided from a web page. As an example, it is assumed that the web page is a blog describing a famous tourist spot.

The apparatus 100 may include an interface (not shown), through which a user can input and/or select a key word derived from text data provided from the web page. The selected key word may relate to location information, such as the name, the address, and/or the phone number of the location.

According to another exemplary embodiment, the apparatus 100 may include an extracting unit (not shown) to extract the key word from the website. As an example, text data provided from the web page is analyzed, based on a predetermined criteria, or titles of images or voice files provided from the web page are analyzed, to thereby extract the key word. It is assumed that the web page provides text describing the tourist spot 'Bulguksa', along with an image named 'Bulguksa.jpg'. In this example, the extracting unit analyzes the text and titles of the image files, and thereby extracts the key word 'Bulguksa'.

If multiple key words are extracted from a web page, the extracted key words are displayed, so that the user may select one of the key words. Once the key word is selected, the request unit 112 sends a request to an external server for location information relating to the key word. As an example, the request unit 112 transmits the key word to an open application programming interface (API), which searches for related location information. The open API searches the database run by the external server for the location information related to the key word.

The receiver 114 receives the location information, which corresponds to the request, from the external receiver. The received location information may include detailed location information, or may include location information that can be used to obtain the detailed location information, such as a name, a phone number, and/or an address. When different types of location information are received, a list including the different types of location information may be generated and displayed. Then, the user may make at least one selection from the list. An apparatus 200 to provide location information, which outputs the list of the received location information, will be described with reference to FIG. 2.

The converter 120 converts the received location information into a format that can be used in the navigation device. The location information may be point of interesting (POI) data used by a web page. The converter 120 may convert the POI data into POI data suitable for use in a navigation device.

The apparatus 100 may further include a target location setting unit (not shown). The target location setting unit may automatically use the converted location information to set a target location on a navigation device. However, the target location setting unit is not required in all aspects of the present invention. According to other exemplary embodiments, the converted location information is stored in a database of a navigation device, and when the user selects the location information related to the target location, the converted location information may be used to set the target location.

Figure 2:
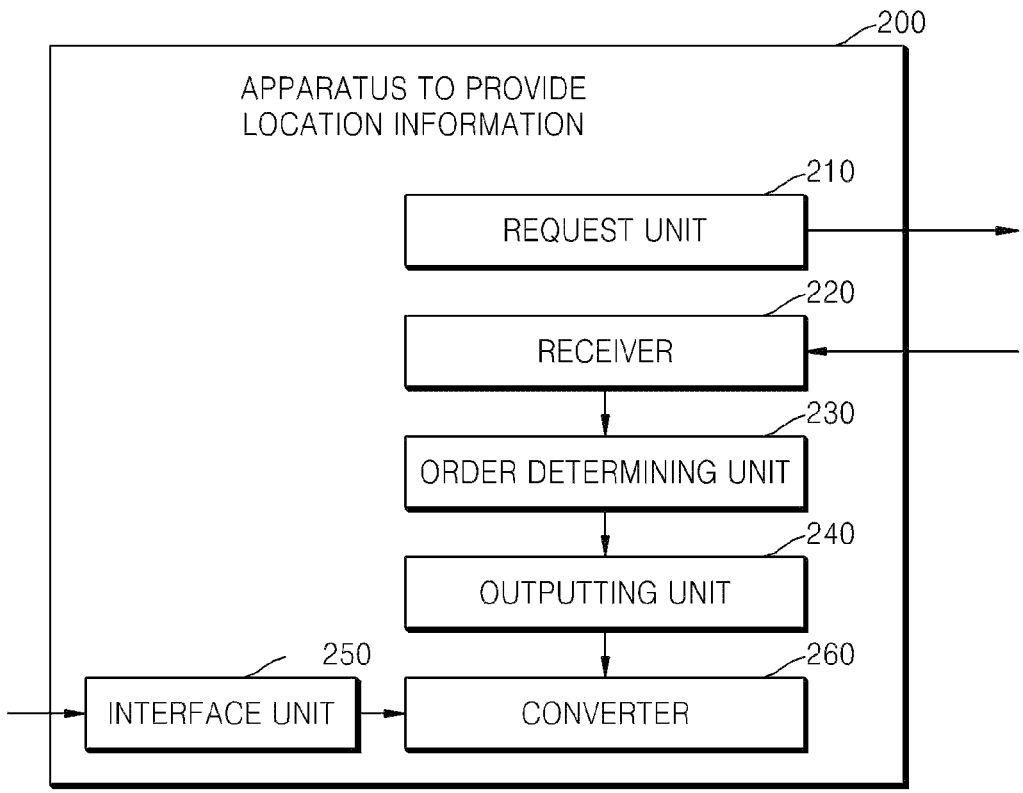
FIG. 2 is a block diagram of an apparatus to provide location information, according to another exemplary embodiment of the present invention.

FIG. 2 is a block diagram of an apparatus 200 to provide location information, according to another exemplary embodiment of the present invention. The apparatus 200 includes a request unit 210, a receiver 220, an order determining unit 230, an outputting unit 240, an interface unit 250, and a converter 260. The request unit 210, the receiver 220, and the converter 260 are similar to the request unit 112, the receiver 114, and the converter 120, respectively, and thus, a detailed description thereof is omitted.

The order determining unit 230 ranks the location information received from an external server (not shown), according to a predetermined standard. As an example, the ranking of the received location information is output can be determined according to the correspondence between the location information received from the external server and data provided from a web page. The order determining unit 230 will be described more fully with reference to FIG. 3.

The outputting unit 240 outputs a list of the location information, which is organized according to the determined ranking. As an example, the outputting unit 240 displays location information having a higher correspondence on the upper portion of a display device (not shown), and the outputting unit 240 displays the location information having a lower correspondence on the lower portion of the display device. That is, the more relevant location information (location information having a higher probability of being selected by a user) is displayed on the upper portion of the display device.

The user makes a selection from the list, using the interface unit 250. The converter 260 then converts the selected location information into a format that can be used in a navigation device. However, according to another exemplary embodiment, the converter 260 can convert all of the received location information into a format that can be used in the navigation device, and can then store the converted location information.

Figure 3:
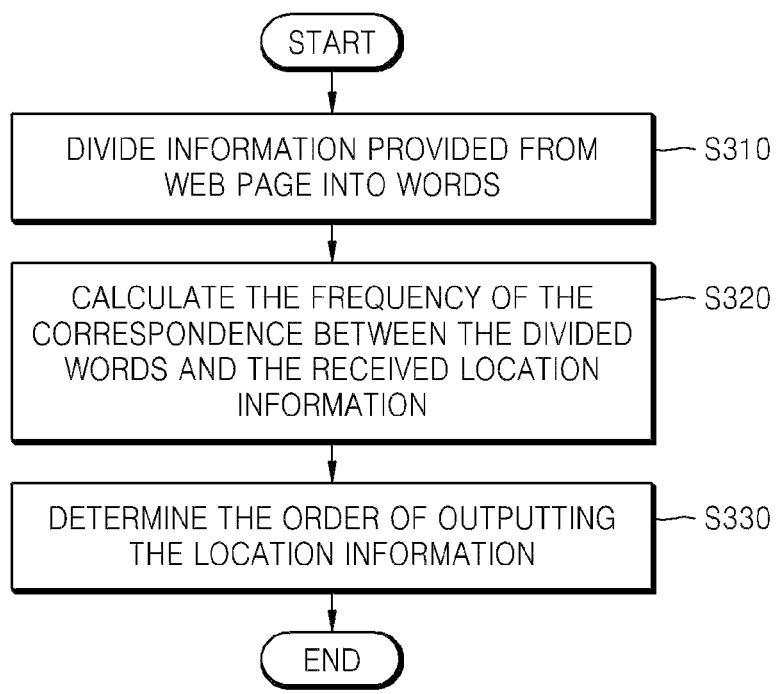
FIG. 3 is a flowchart illustrating the operation of an order determining unit of FIG. 2.

FIG. 3 is a flowchart illustrating operations of the order determining unit 230. In operation S310, information provided from one or more web pages is reproduced as text. That is, the information provided from the web pages is divided into blocks of text, in order to determine the correspondence between the data provided from the web pages and the location information received from the external server. In operation S320, the correspondence between the blocks of text and the received location information is calculated.

In operation S330, the order of outputting the location information is determined, according to the determined correspondence. That is, the location information is ranked and output according to the determined correspondence. According to another exemplary embodiment, some information, such as the names of image files and/or highlighted words, is given more weight more than other information. Therefore, if a block of text includes a word corresponding to the specific information, the block of text is ranked higher than other blocks of text.

FIGS. 4A-4D illustrate screen shots produced by an apparatus to provide location information, according to an exemplary embodiment of the present invention. In FIG. 4A, the user accesses a desired web page, through a search engine, or by directly inputting the address of the web page. It is assumed in FIG. 4A that the user accesses the web page by inputting the key word 'Gangnam good food restaurant recommendation' into a search engine. Then, information about the 'Saemaeul restaurant' located in the 'Gangnam' area is provided in the web page. Thus, the user can obtain location information about the 'Saemaeul restaurant', using a key word from the web page.

In FIG. 4B, the user selects the 'Saemaeul restaurant' as the key word to be used in obtaining location information. The method of selecting the key word may vary, according to various embodiments. As an example, the user may directly input 'Saemaeul restaurant' into a key word field, or may press a specific button while a cursor is on a specific word, to select the key word. When the user selects 'Saemaeul restaurant' and then right clicks, a 'keyword search' pop-up window appears, for example. When the user clicks the menu called 'keyword search', the word 'Saemaeul restaurant' is entered as the key word.

According to another exemplary embodiment, information provided from a web page is analyzed to extract a key word, or one or more extracted key words are displayed, so that the user may make manually select a key word. When the user selects the key word, the apparatus to provide location information sends a request to an external server for location information that is related to the selected key word.

In FIG. 4C, the apparatus to provide location information receives the corresponding location information from the external server. That is, the location information related to the 'Saemaeul restaurant' is received and is then displayed to the user. In the current exemplary embodiment, a list is displayed that includes various related pieces of location information, i.e., a name, an address, and a phone number.

In FIG. 4D, the user selects the desired location information from the list. The apparatus to provide location information converts the selected location information into a format that can be used in a navigation device. In detail, the converted location information may be automatically stored in a database of a navigation device, or may be stored in a user-selected location. According to another exemplary embodiment, the converted location information may be automatically set as a target location, in a navigation device.

Figure 5:
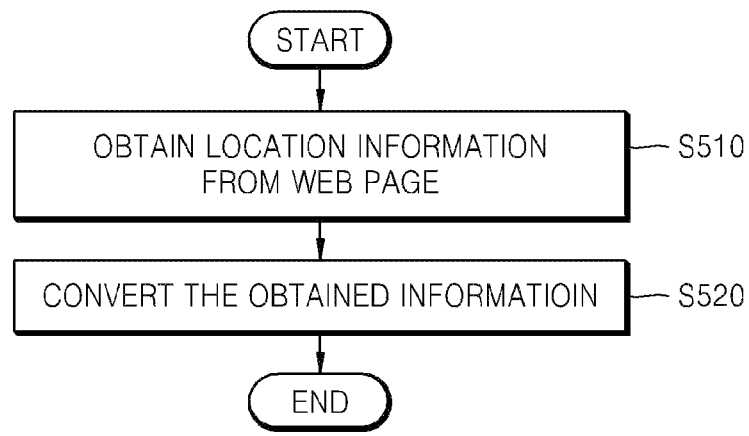
FIG. 5 is a flowchart illustrating a method of providing location information, according to an exemplary embodiment of the present invention.

FIG. 5 is a flowchart illustrating a method of providing location information, according to an exemplary embodiment of the present invention. In operation 510, location information is obtained from one or more web pages. When a web page provides location information that is detailed enough to set a location, such as geographical information or an address, the location information can be directly obtained from the web page. However, when a web page does not include detailed location information, for example, when the web page is a blog or a personal homepage, the user can then search for the detailed location information. In this case, a key word is obtained from the web page, and detailed location information related to the key word is obtained from an external server. In the present exemplary embodiment, the external server runs a database including detailed location information and transmits location information that is related to the key word, to the user.

The location information received from the external server is ranked, according to a predetermined standard. As an example, the received location information and the data provided from the web page are compared to each other, and the location information having the highest correspondence is determined to be the location information with the highest probability for user selection and is output accordingly. In operation 520, the obtained location information is converted into a format that can be used in a navigation device.

Figure 6:
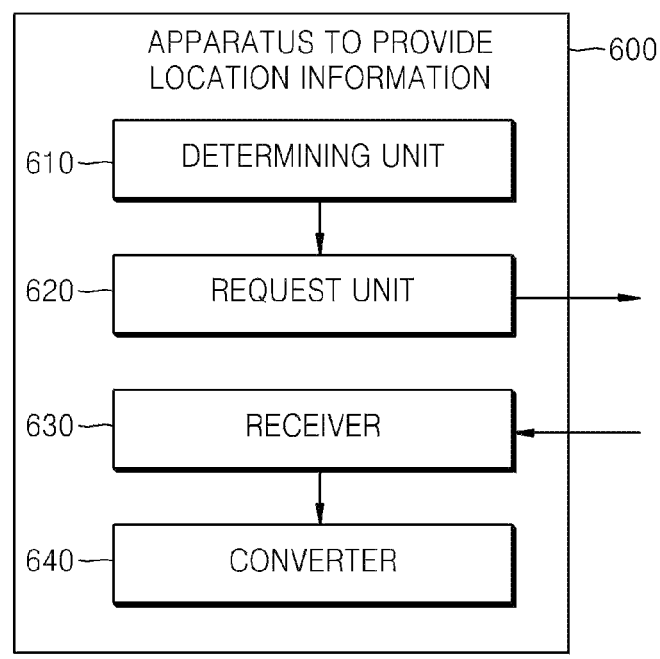
FIG. 6 is a block diagram of an apparatus to provide location information, according to another exemplary embodiment of the present invention.

FIG. 6 is a block diagram of an apparatus 600 to provide location information, according to another exemplary embodiment of the present invention. The apparatus 600 includes a determining unit 610, a request unit 620, a receiver 630, and a converter 640. The apparatus 600 may be separate from a navigation device, or may be incorporated within a navigation device. Herein the apparatus 600 is described as being incorporated within a navigation device.

When a user inputs a key word related to a target location, the determining unit 610 searches for location information related to the key word a database of the navigation device. If the location information is stored in the database, a target location is set using the stored location information, and the navigation device searches for a route to the target location. When the location information is not stored in the database, the request unit 620 sends a request to an external server for the location information.

Once the receiver 630 receives the location information from the external server, the converter 640 converts the received location information into a format that can be used by the navigation device. The apparatus 600 may further include at least one of an order determining unit (not shown), an outputting unit (not shown), and an interface unit (not shown). The outputting unit may be a display unit.

The order determining unit ranks the converted location information, according to a predetermined standard. The outputting unit outputs a list of the location information, based on the ranking. A user makes a selection from the list, using the interface unit. The user selects the location information through the interface unit.

The apparatus 600 may further include a target location determining unit (not shown). The target location determining unit can set the user-selected location information as the target location, in the navigation device.

Figure 7:
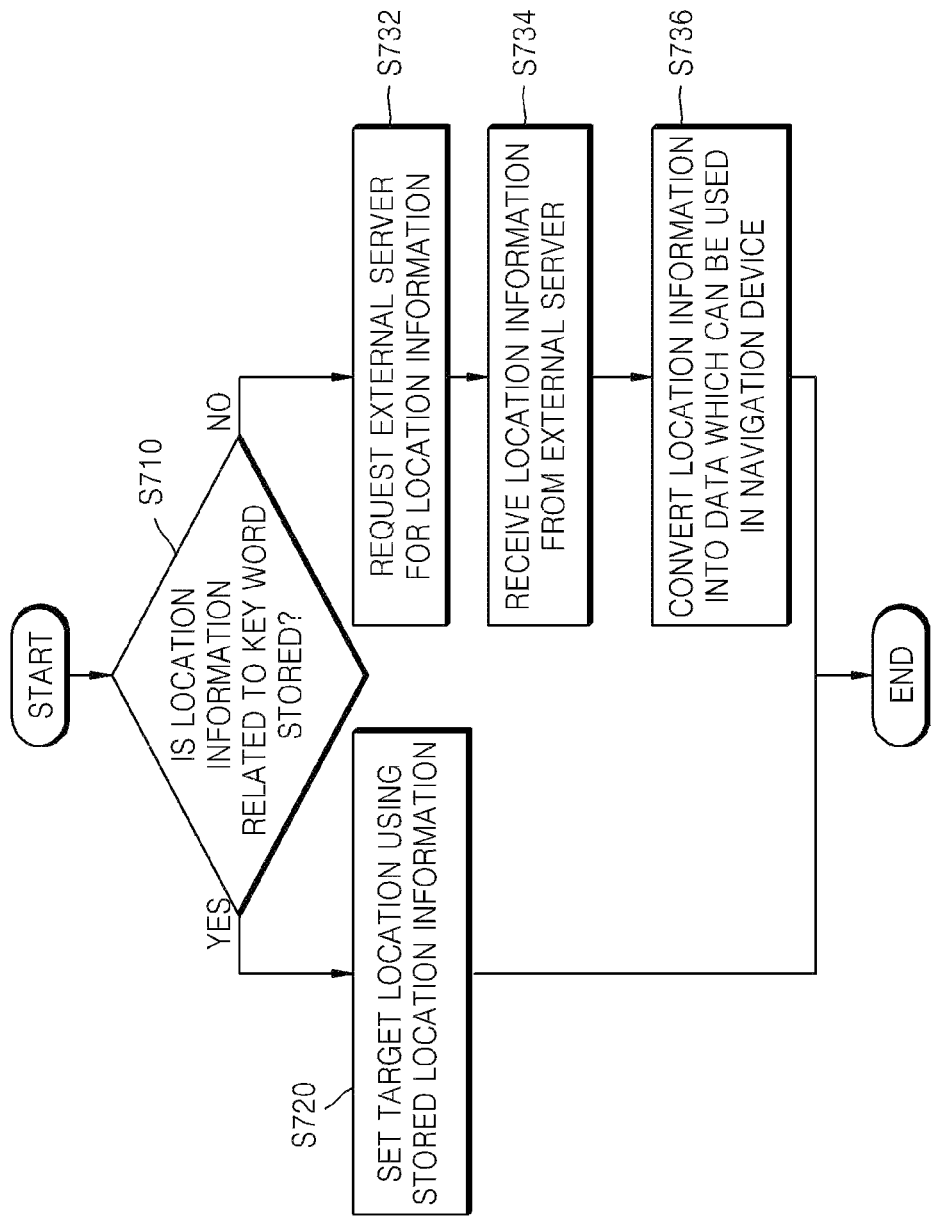
FIG. 7 is a flowchart illustrating a method of providing location information, according to another exemplary embodiment of the present invention.

FIG. 7 is a flowchart illustrating a method of providing location information, according to another exemplary embodiment of the present invention. In operation S710, when a target location key word is input, a determination is made as to whether location information related to the key word is stored in the navigation device. If the location information is stored, operation S720 is performed. In operation S720, a target location is set using the stored location information.

If the location information is not stored, operation S732 is performed. Then, in operation S732, a location information request is sent to an external server, using the key word.

In operation S734, location information, which corresponds to the request, is received from the external server. In operation S736, the received location information is converted into a format that can be used in a navigation device.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A method of providing location information through a navigation device, the method comprising:
   obtaining the location information from a web page through a network;
   converting the obtained location information into a format that is usable by the navigation device.

2. The method of claim 1, wherein the obtaining of the location information comprises:
   extracting a key word from data from the web page;
   sending a request to an external server for the location information, using the key word; and
   receiving the location information from the external server.

3. The method of claim 2, further comprising:
   ranking the received location information, according to a predetermined standard;
   outputting a list of the received location information, based on the ranking; and
   making a selection from the list,
   wherein the converting of the obtained location information comprises converting the selection from the list into a format that is usable by the navigation device.

4. The method of claim 3, wherein the ranking of the received location information comprises determined the correspondence between the received location information and the web page data.

5. The method of claim 3, further comprising setting a target location on the navigation device, using the converted location information.

6. The method of claim 1, wherein the obtaining of the location information comprises:
   selecting a key word from text data provided from the web page;
   sending a request to an external server for the location information, using the key word; and
   receiving the location information from the external server.

7. The method of claim 1, wherein the location information is point of interest (POI) data.

8. A computer readable recording medium having embodied thereon a computer program for executing the method of claim 1.

9. The method of claim 1, wherein the obtaining of the location information comprises:
   extracting a key word from data from a web page;
   searching the navigation for the location information, using the key word; and
   sending a request to an external server for the location information, using the key word, if the location information is not found on the navigation device; and
   receiving the location information from the external server.

10. A method of providing location information through a navigation device, the method comprising:
    searching for location information stored in the navigation device, using a keyword;
    sending a request to an external server for the location information, using the key word, if the location information is not found in the navigation device;
    receiving the location information from the external server; and
    converting the received location information into a format that is usable by the navigation device.

11. The method of claim 10, further comprising:
    ranking the converted location information, according to a predetermined standard; and outputting a list of the converted location information on the navigation device, based on the ranking.

12. The method of claim 11, further comprising:
making a selection from the list; and
setting a target location in the navigation device, using the selection from the list.

13. The method of claim 10, further comprising extracting the key word from data from a web page, prior to the searching of the navigation device.

14. An apparatus to provide location information through a navigation device, the apparatus comprising:
   a location information obtaining unit to obtain location information from a web page through a network; and
   a converter to convert the obtained location information into a format that is usable by the navigation device.

15. The apparatus of claim 14, wherein the location information obtaining unit comprises:
   a key word extracting unit to extract a key word from text data provided from the web page;
   a request unit to send a request to an external server for the location information, using the key word; and
   a receiver to receive the location information from the external server.

16. The apparatus of claim 14, wherein the location information obtaining unit comprises an interface unit to allow a user to select a key word from text data from the web page.

17. The apparatus of claim 15, further comprising:
   an order determining unit to rank the received location information, according to a predetermined standard;
   an outputting unit to output a list of the received location information, based on the ranking; and
   an interface unit to allow a user to make selection from the list,
wherein the converter converts the selection from the list into a format that is usable by the navigation device.

18. The apparatus of claim 17, wherein the order determining unit determines the ranking, according to the correspondence between the received location information and the text data.

19. The apparatus of claim 17, further comprising a target location setting unit to set a target location on the navigation device, using the selection from the list.

20. The apparatus of claim 14, wherein the location information is point of interesting (POI) data.

21. An apparatus to provide location information through a navigation device, the apparatus comprising:
   a determining unit to search the navigation device for location information, using a key word;
   a request unit to send a request to an external server for the location information, if the location information is not found by the search;
   a receiver to receive the location information from the external server; and
   a converter to convert the received location information into a format that is usable by the navigation device.

22. The apparatus of claim 21, further comprising:
   an order determining unit to rank the converted location information, according to a predetermined standard; and
   an outputting unit to output a list of the converted location information, based on the ranking.

23. The apparatus of claim 22, further comprising:
an interface unit to allow a user to make a selection from the list; and
a target location determining unit to set a target location on the navigation device, using the selection from the list.

* * * * *